June 3, 1924.
A. M. FAIRLIE
COCK
Filed Nov. 17, 1919
1,496,259
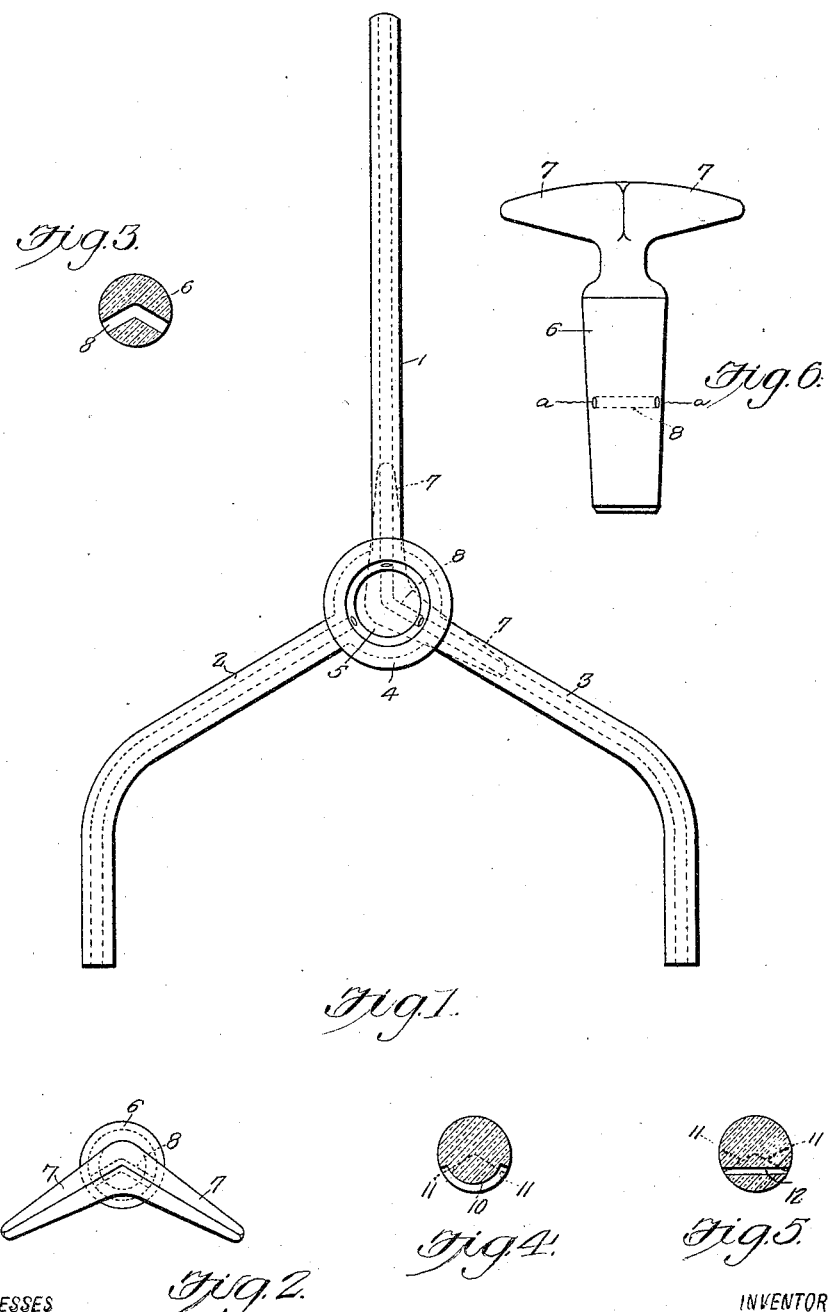

Patented June 3, 1924.

1,496,259

UNITED STATES PATENT OFFICE.

ANDREW M. FAIRLIE, OF ATLANTA, GEORGIA.

COCK.

Application filed November 17, 1919. Serial No. 338,431.

*To all whom it may concern:*

Be it known that I, ANDREW M. FAIRLIE, a citizen of the United States of America, residing at Atlanta, in the county of Fulton and State of Georgia, have invented certain new and useful Improvements in Cocks, of which the following is a specification.

The present invention relates to a cock especially suitable for use in connection with various chemical laboratory apparatus in which the cock connects tubes or pipes which are at an angle to each other, and is shown illustratively in Fig. 1 of the drawing as being capable of connecting any two of the three branches of a Y. The invention is also useful in connection with various other piping devices used in connection with the chemical industries, aside from laboratory apparatus. The object of the invention is to produce a cock suitable for branched or angular tube or pipe connections, in such a manner that the two fins of the handle of the cock will lie directly over (or directly in front of) the two pipes which are to be connected, so that the position of the two fins of the handle will directly indicate the position of the port (especially the two ends of the port) in the cock plug.

In the accompanying drawings, Fig. 1 shows a Y made, for example, of glass tubing and in dotted lines shows the position of the handle of the cock and of the port in the cock plug. Fig. 2 is a plan view of the cock plug and handle. Fig. 3 is a section of the cock plug taken on the level of the port, this level being indicated by the dotted line a—a in Fig. 6. Fig. 4 is a section similar to Fig. 3 but showing a modification of the plug, in which a groove is cut in the surface of the plug to form the channel for conveying the liquid or gas. Fig. 5 is a similar view of a further modification showing a straight passage board through the cock plug. Fig. 6 is a vertical elevation of the plug and handle shown in Figs. 2 and 3.

In Fig. 1 is shown a Y consisting of the glass tubes 1, 2 and 3, these being joined to a substantially cylindrical piece or socket 4, having an opening 5 therein into which the tapered plug 6 of the clock shown in Fig. 6 is adapted to fit. The interior surface of the opening 5 and the exterior surface of the plug 6 are ground together so as to produce an accurate fit. The three tubes 1, 2 and 3 are shown as meeting at an angle of 120°. The tube 1 will be hereinafter referred to as the feed tube and the branches 2 and 3 will be hereinafter referred to as the discharge branches since liquid fed in by gravity through the tube 1 can be discharged through either the tubes 2 or 3. In Fig. 1 the dotted line 7 shows the relative position of the two fins of the handle of the cock plug and the dotted lines 8 show the position of the port in the plug and it will be noted that the upper fin 7 is directly parallel with the tube 1 and the lower fin 7 is directly parallel with the tube 3 thereby directly indicating that the passage between the tube 1 and the tube 3 is opened. In the device shown in Fig. 1 the tubes 1, 2 and 3 meet each other at an angle of 120° so that this cock can be used to connect the tubes 1 and 3 or the tubes 1 and 2 or the tubes 2 and 3, should occasion require. The port 8 shown in Figs. 1, 2 and 3 is shown as consisting of two angular bores arranged radially and meeting each other in the axis of the cock plug. With this kind of a bore in the cock plug the two fins composing the handle of the valve will lie directly over the two portions of the bore, and are parallel thereto. In the modification shown in Fig. 4, instead of forming two radial bores meeting each other in the axis of the cock plug, a groove or channel 10 is cut or cast in the surface of the cock plug, which itself forms the passage through which the liquid or gas flows, for example, from the tube 1 to the tube 3. In this case, the dotted lines 11 represent what would be equivalent to the center lines of the two radial portions of the passage 8 of Fig. 3.

In Fig. 5 is shown a different modification in which a straight bore 12 takes the place of the two radial portions of the bore 8. In the modifications shown in Figs. 4 and 5 the two fins of the handle are placed directly above the ends of the channel or bore 10 and 12 respectively, the center lines of the fins 7 being parallel with the dotted lines 11.

In the drawings, Figs. 1 and 2, the means for directly indicating the position of the ends of the port in the plug are shown as the fins of the plug handle, which are so shaped that one fin passes over or points toward one end of the port in the plug, while the other fin passes over or points toward the other end of said port.

I am, of course, aware that cocks have heretofore been made for connecting bent, or angularly joined, pipes, such cocks having handles thereupon which, according to some arbitrary system, indicates the position of the port in the plug. With such devices, however, it is necessary to explain to each user the relation between the position of the handle and the position of the plug bore. This is particularly necessary in chemical apparatus, analytical chemical apparatus, for example, in which it is not possible at all times to remove the plug, owing to the possibility of loss of liquid contained in the apparatus, which apparatus cannot always be conveniently emptied without entailing great loss of time, and frequently also the loss of results of determinations which are in progress.

Furthermore, the devices for indicating the position of the port in a cock plug, or the positions of the ends thereof, in existence prior to this invention, have never been sufficiently accurate or definite, in service. The operator, using the prior devices, often finds that passages which he thought were entirely closed, were in fact slightly opened, or that passages which he desired to open wide to each other were only partly open, thus delaying the operations, or vitiating the results. The device herein described not only indicates whether certain passages are opened or closed to each other, but does so with unusual certainty and accuracy, indicating, for passages that are opened to each other, to what extent they are opened.

In the particular modification shown, it is possible to connect together any two of the three branches of the Y, since these three branches all meet at angles of 120°. The cock plug and handle herein illustrated are, however, equally applicable in other instances, for example, where it might be desirable to connect the pipes 1 and 3 or to connect the pipes 1 and 2, but in which there would be no utility in connecting the pipes 2 and 3, and even a connection between pipes 2 and 3 might be disadvantageous. For this purpose the angle between pipes 1 and 3 and the angle between pipes 1 and 2 could be made equal, but substantially less than (or in some cases greater than) 120°.

The device is also applicable to other uses, for example, where four or even a greater number of pipes or tubes are connected to a socket, in such a case, the cock might be made to connect any two adjacent pipes.

When used in chemical laboratory apparatus, the tubes 1, 2 and 3, the union or socket 4 and the plug 6 will generally be made of glass, acid resisting porcelain or the like, (acid-resisting vitreous materials).

I claim:

A three-way cock consisting of a plug socket having three radial openings spaced 120 degrees apart, a plug fitting said socket and provided with a passage carried thereby having its ends disposed at 120 degrees from each other circumferentially of the plug, said ends being positioned to be brought into registry with any two of the three openings in the socket, and a handle on said plug having a pair of arms disposed at 120 degrees and alined with the ends of the passage in the plug.

In testimony whereof I affix my signature.

ANDREW M. FAIRLIE.